United States Patent [19]

Bogart et al.

[11] 3,965,580

[45] June 29, 1976

[54] DEVICE FOR DETERMINING THE SIZE DASH NUMBER OF STANDARD O-RINGS

[75] Inventors: James S. Bogart, Farmington Hills, Mich.; John M. Wilcox, Columbia, S.C.

[73] Assignee: Federal-Mogul Corporation, Detroit, Mich.

[22] Filed: Oct. 29, 1974

[21] Appl. No.: 518,610

[52] U.S. Cl. ............................ 33/143 M; 33/147 T
[51] Int. Cl.² ...................... G01B 5/08; G01B 3/20
[58] Field of Search .......... 33/147 T, 143 R, 143 M, 33/143 J, 143 K, 161, 168 R, 158, 147 J, 125 R

[56] References Cited
UNITED STATES PATENTS

| | | | |
|---|---|---|---|
| 648,390 | 5/1900 | Coe | 33/178 R |
| 2,401,920 | 6/1946 | Farrance | 33/165 |
| 3,391,462 | 7/1968 | Craine | 33/143 M |
| 3,696,511 | 10/1972 | Bixler | 33/143 R |

Primary Examiner—Richard E. Aegerter
Assistant Examiner—Willis Little
Attorney, Agent, or Firm—Robert F. Hess

[57] ABSTRACT

A pair of telescoping elongated prisms locked against separation provide a series of size indications by dash numbers for standardized O-rings in a series of windows. Each face of the inner prism has a semicylindrical projection which matches a similar projection on the outer prism and rests up against it to form what looks like a stationary pulley wheel. Also, the inner prism is provided with diameter-determining grooves. The outer prism also has on each face, or most faces, a projection that looks like a pulley wheel and is the same size as that formed by the matching semicylindrical projections and is spaced away from it. The use of the windows in the outer prism and the figures printed on the inner prism enables one to determine the size number of any standard O-ring by first determining its diameter from the measuring grooves and then inserting it on the proper pulley-like projections and extending the slide until the O-ring is taut but not stretched and then reading the dash number size of the O-ring in the appropriate window.

7 Claims, 8 Drawing Figures

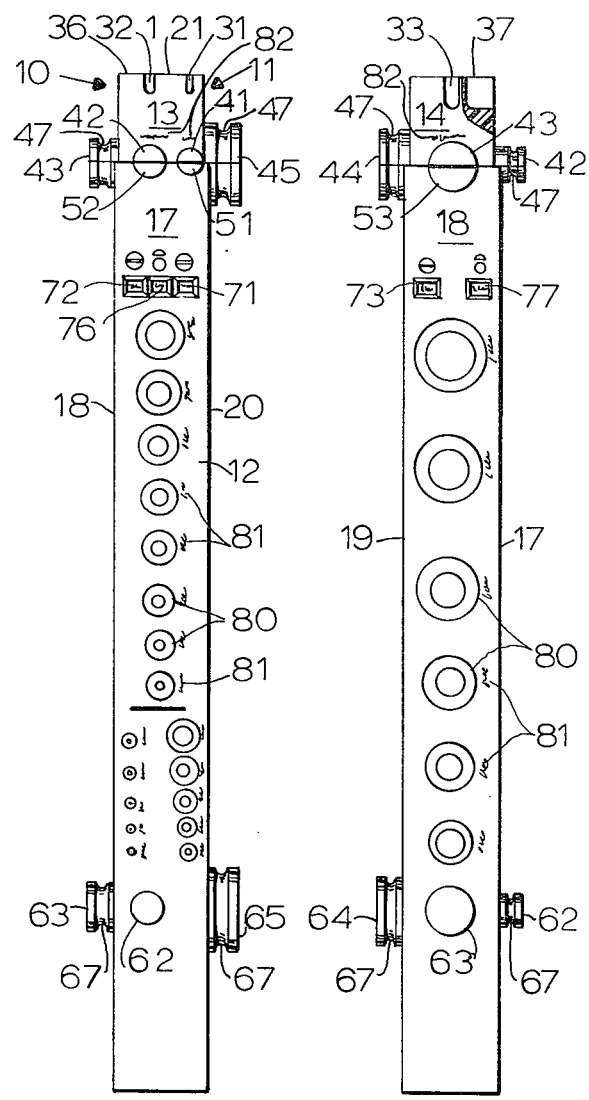
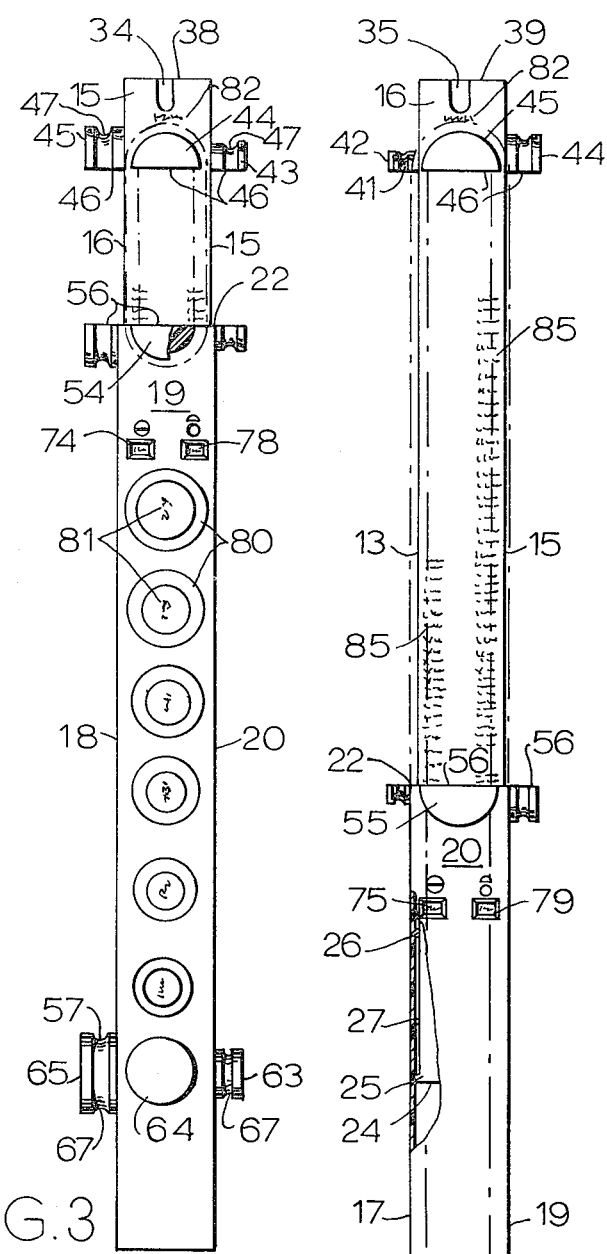
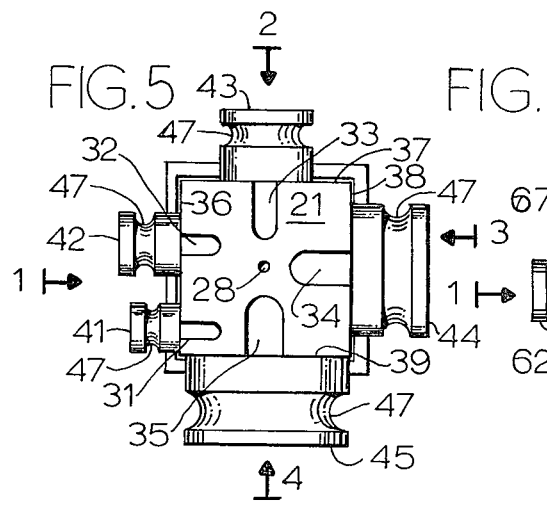
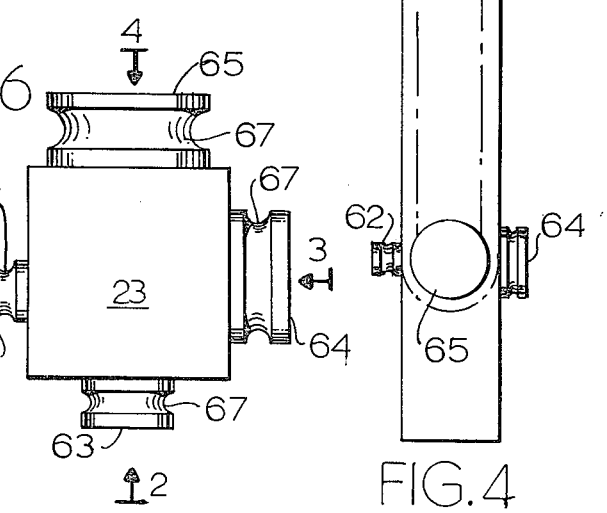
FIG.1  FIG.2  FIG.3  FIG.4  FIG.5  FIG.6

DEVICE FOR DETERMINING THE SIZE DASH NUMBER OF STANDARD O-RINGS

BACKGROUND OF THE INVENTION

This invention relates to a device for determining the dash number size of standard O-rings.

O-rings have long existed in a wide variety of sizes of varying thicknesses and varying diameters. However, a few years ago the United States Department of Defense, in order to standardize O-rings for its own use, issued a standard size catalog which classifies all the O-rings concerned into five categories of section thickness and into approximately 350 different individual sizes, depending not only on the thickness but also on the diameters of the O-rings. It has thus become possible by use of these standard sizes to determine an O-ring size of any standard device and to obtain a replacement by properly measuring the O-ring.

However, since there are some 350 individual sizes of standard O-rings all identified by what is known as the "dash number" under AS-568 series, these sizes do require measurement. People in the field do not often have calipers available suitable for this and even then they would have to have a chart to show what the calipers meant. Accordingly, it has taken a considerable time for a maintenance man to determine the size and then for a parts supply man or stock man to convert that size into the actual catalog dash number under which the O-ring is found. Guesswork selections are, of course, time-consuming and result in costly equipment malfunctions if the wrong selection should be made; so it is important to have the right selection and have it quickly. Several devices have been proposed for doing this, but they have generally been incomplete or have required too many pieces or have had other similar disadvantages.

SUMMARY OF THE INVENTION

The present invention incorporates a pair of slidably mounted telescoping elongated prisms, preferably generally square in cross section, the two prisms match and slide relatively to each other with the inner prism being locked to stay within the outer prism even at a point of maximum extension. A number of windows and rows of printed numbers provide the size identification, which is determined in a manner now to be described. By "prism" is meant a beam or tube wherein the inner prism may be solid or hollow but the outer telescoping prism must necessarily be hollow.

One prism, preferably the inner prism, has at its end wall a series of grooves each representing one of the five standard cross-sectional thickness categories; one of the walls may have two of these grooves, and the other faces have one apiece. By inserting the O-ring into the proper groove, the correct cross-sectional thickness category is determined.

Next, the O-ring diameter has to be determined. This is done by having the inner prism carry a series of semi-cylindrical projections and the outer prism carry a corresponding series, so that each projection mates with a corresponding projection on the inner prism to form a more or less cylindrical projection having an annular groove therein; the projections look somewhat like one-half of a stationary pulley having an annular groove in its face in which the O-ring can fit, the groove being the same size as the measuring groove that determines the cross-sectional thickness category. Then when the inner prism is extended until the O-ring is taut but not stretched, the correct size dash number, being one of a series of dash numbers printed on the inner prism is exposed through a window of the outer prism, the window being sized to display only one dash number at a time.

Some O-rings, however, are too large to make the length of such a sliding device practical. In order to save on length, the present invention provides, in addition to the projections noted, another projection for each face at the opposite end of the outer prism. These projections may preferably be substantially symmetrical in shape and may look like pulley wheels, but preferably they are stationary. Then, to measure O-ring sizes larger than those measurable by fully extending the inner prism, the O-ring is inserted on the semicylindrical projection of the inner prism and on the cylindrical prism of the opposite end of the outer prism; the inner prism is extended to the point where the O-ring is taut but not stretched and, then, in a different window, suitably keyed, the user can read the correct dash number.

A few O-rings are too small to conform to this procedure but there are comparatively few such small sizes, and the present invention takes care of them by printing on the face of the outer prism which is aligned with the correct thickness of measuring groove, a series of silhouettes corresponding to these small-size O-rings. After determining the proper thickness, the user simply finds the correct silhouette by placing his O-ring over the silhouette corresponding to it and reading the dash number printed near that silhouette.

Thus, the size of each of the standard AS-568 series O-rings is determined by the device of this invention.

Other objects and advantages of the invention will appear from a description of a preferred embodiment of the invention.

BRIEF DESCRIPTION OF THE DRAWINGS

In the drawings:

FIG. 1 is a view in side elevation of a device embodying the principles of the invention. The device is telescoped into its fully closed position, where the semicylindrical projections at one end match and form a stop.

FIG. 2 is a similar view from another side with a portion of the outer end of the inner prism being shown in section.

FIG. 3 is another view from a still different side with the device shown partially extended and with an installed O-ring shown in dotted lines and with a portion of the semi-cylindrical projection on the outer prism of the device shown in section. The columns of size dash numbers are indicated diagrammatically in part.

FIG. 4 is a similar view of still another side of the device nearly fully extended with a larger O-ring size, the device again being shown partly in section and with broken lines indicating an installation of a very large diameter O-ring.

FIG. 5 is a view in end elevation of one end of the device.

FIG. 6 is a view in end elevation of the other end of the device.

DESCRIPTION OF A PREFERRED EMBODIMENT

Figure 7:
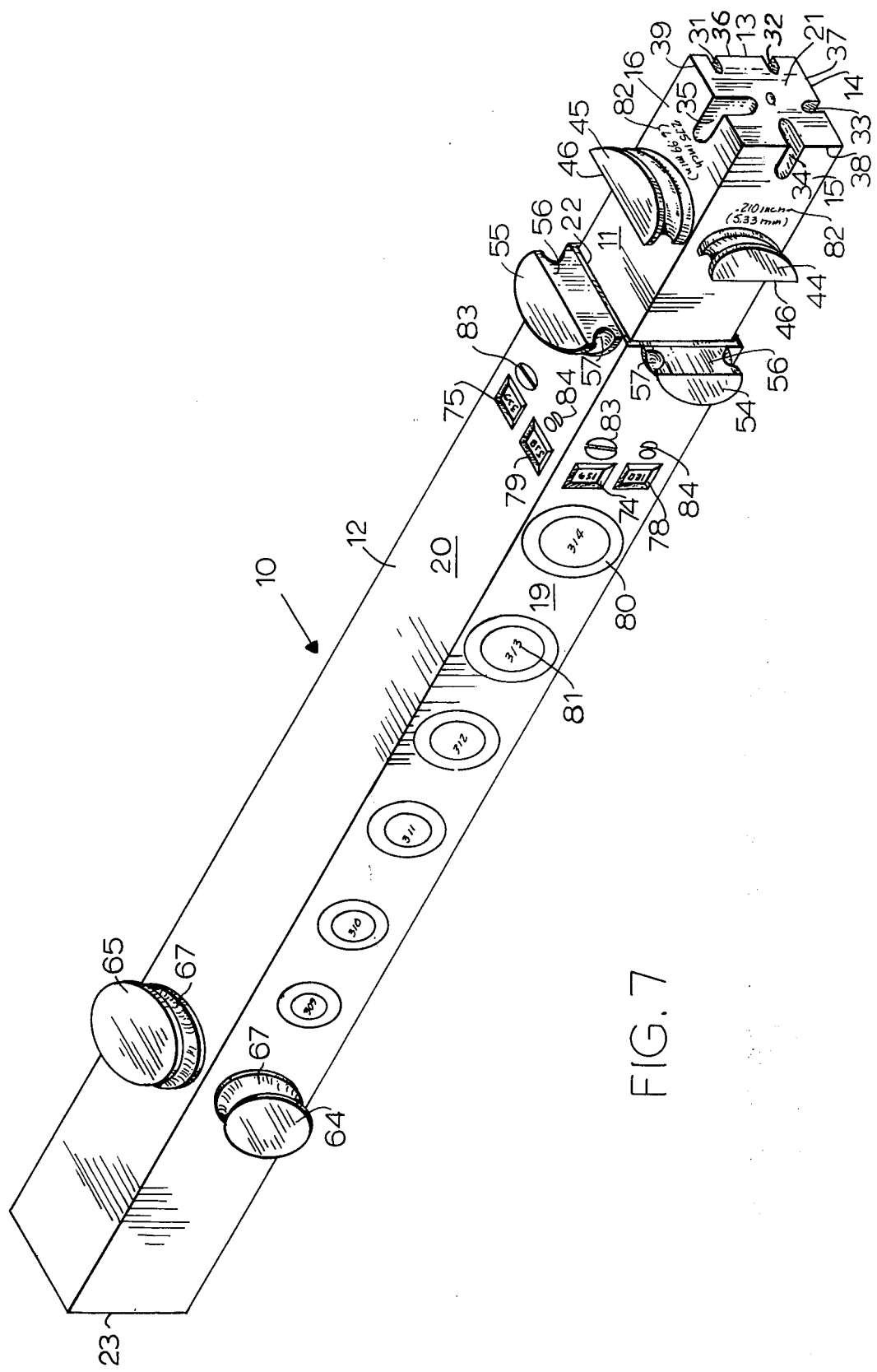
FIG. 7 is an isometric view of the device shown partially extended.

The drawings show a device involving a particular embodiment. This is a unit 10 which is made up of two telescoping prisms 11 and 12. The inner prism 11 and the outer prism 12 are made so that they slide in a sufficiently snug fit to avoid inaccuracies but with a sufficiently loose fit so that there is no problem whatever in sliding them. The configuration shown is that of rectangular prisms, with the inner prism 11 having four faces 13, 14, 15, and 16, shown respectively in FIGS. 1, 2, 3, and 4, and the outer prism 12 having four faces 17, 18, 19, and 20. The inner prism has an outer end wall 21 and the outer prism has an open or hollow end wall 22. The outer prism also has an end wall 23 at the opposite end from the wall 22 and the inner prism has a wall 24, as seen in a cutaway portion of FIG. 4, which is never exposed, since the two prisms are locked together as by having a shoulder 25 on the inner prism extending outwardly and a projection 26 in the bore 27 of the outer prism.

At the end wall 21 a series of measuring grooves is provided for determining the thickness of the O-rings. In the AS-568 series there are five standard thicknesses and therefore there are five grooves 31, 32, 33, 34, and 35, the smallest one being 31 and the largest 35. Each groove extends in at the corner edge 36, 37, 38, or 39 where one of the faces 13, 14, 15, or 16, meets the end wall 21. Each groove is preferably provided with a bottom which has a circular arc, but is also preferably deep enough so that the O-ring can be inserted fully into the groove in order that its thickness can be accurately determined. The user for this purpose simply determines the thickness category by slipping the O-ring into the particular groove that will accept it without undue tolerance. Thus, the largest groove 35 will accept all categories of O-rings, but the largest category is easily determined by seeing that the O-ring will not fit into the groove 34 which is the next smallest. The O-ring is put into the smallest groove that will accept it.

Each thickness groove 31, 32, 33, 34, 35 is also provided with suitable indicia 82 adjacent thereto, so that the user knows exactly what O-ring thickness it represents. Preferably, this is given in thousandths of an inch and also in millimeters to the nearest one-hundredth of a millimeter.

The end wall 21 also has an opening 28 which leads into the hollow interior of the inner prism 11 and which permits the passage of air when the inner prism 11 is moved back and forth and therefore prevents compression of air or vacuum inside the two prisms from resisting their free movement.

The proper category of the five different thicknesses having been determined, the next operation is to determine the proper diameter. There are, accordingly, five semicylindrical projections 41, 42, 43, 44, and 45 extending from the inner prism, each projection being located on the same face as the appropriate measuring groove and each one being located with its semicylindrical arc facing the end wall 21 and with its flat surface 46 aligned with the flat surface 46 of each other of the semicylindrical projections so that they all lie in the same plane and a series of stop surfaces is provided. Each one of these projections 41, 42, 43, 44, and 45 has an annular groove 47 which is the same diameter as the corresponding measuring groove 31, 32, 33, 34, or 35 or approximately so, and which makes each projection look like half of a pulley wheel, though fixed in position.

Each semicylindrical projection 41, 42, 43, 44, and 45 on the inner prism is matched by a similar projection 51, 52, 53, 54, and 55 on the outer prism. The flat face 56 of each one of these lies in the flat plane of the end wall 22 and mates against its matching semicylindrical projection 41,42, 43, 44, 45 to form (when they are adjacent each other) a cylinder or what looks like a pulley wheel split down the middle, although it is fixed in position. An annular groove 57 is provided in each one of these projections 51, 52, 53, 54, 55 to receive the O-ring to be measured, and it has again the same thickness and cross section as the groove 47, each one of them having a semicircular shape and making, when the two are joined together, an annulus.

As already stated above, the size is to be determined by extending the inner prism 11 outwardly until the O-ring inserted across the two appropriate semicylindrical members is in a taut position but not stretched. However, some O-rings are too large in diameter to make it convenient to have a slide device of this type that would be long enough; therefore the present invention provides for a relatively short O-ring gauge system by a second series of pulley wheel-like projections 62, 63, 64, and 65 on the outer prism each having an annular groove 67. There is no projection corresponding to the projection 51 because those are so small that they never appear in that large a diameter but there are members corresponding to the other sizes. This means that in those instances, the O-ring is placed partly over the projection say 42 of the inner prism and partly over the projection 62 of the outer prism and then the prism is extended. By this means, the larger sizes can be measured using only slightly greater than half the caliper length that would be required if it were to be done all by the two respective matching semicylindrical pairs, 42 and 52.

For measurement by use of these split pulley members a series of windows are provided in the outer prism, there being one window 72 corresponding to the two mating projections, such as 42 and 52, and another window 76 corresponding to measurements taken when the projection 42 is used in conjunction with the projection 62. The windows thus are: window 71 corresponding to the members 41 and 51, a window 72 corresponding to the members 42 and 52, a window 73 corresponding to the members 43 and 53, the window 74 corresponding to the members 44 and 54, a window 75 corresponding to the members 45 and 55, and also a window 76 corresponding to the members 42 and 62, a window 77 corresponding to the members 43 and 63, a window 78 corresponding to the members 44 and 64 and a window 79 corresponding to the members 45 and 65. The inner prism 11 is accordingly provided with a series of numbers corresponding to the windows and appearing in the window which is appropriate when the O-ring reaches the proper location.

Figure 8:
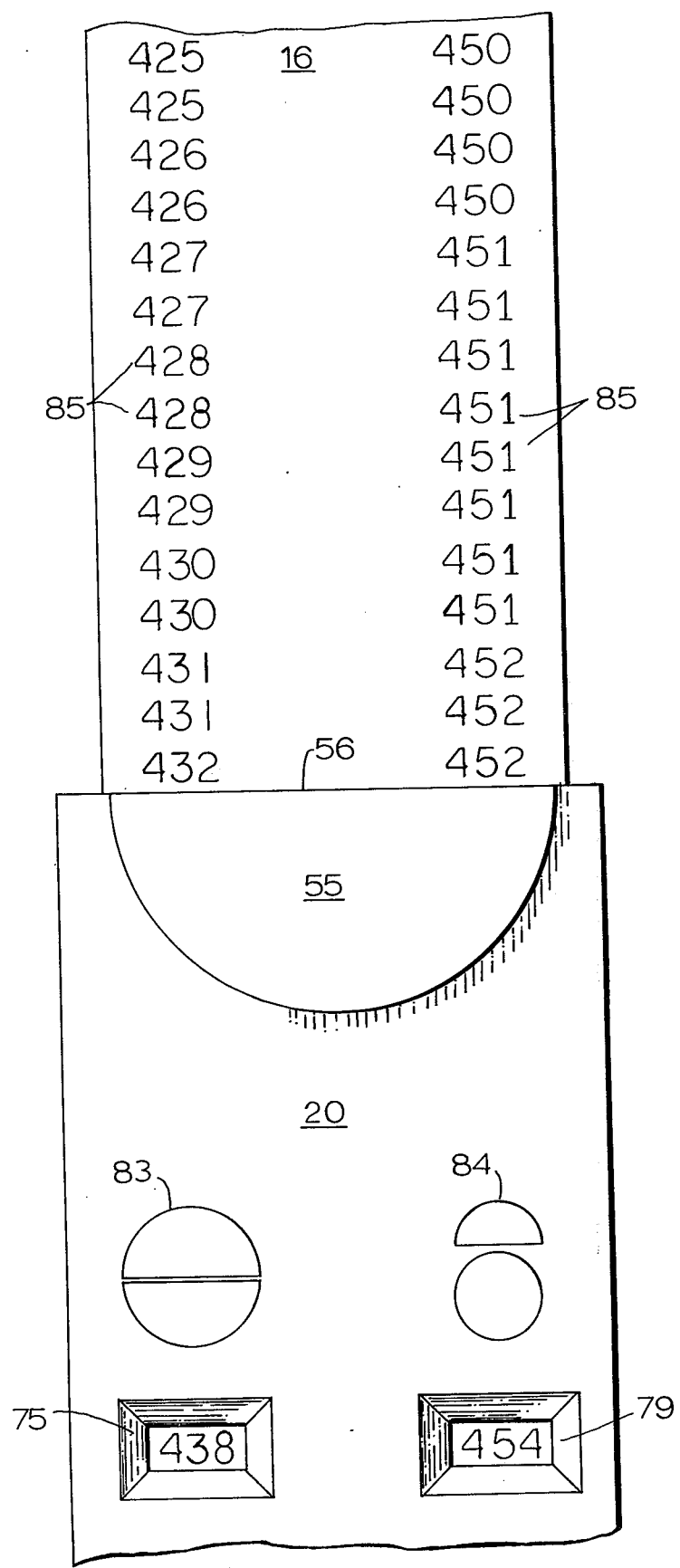
FIG. 8 is a fragmentary enlarged view of the device as shown in FIG. 4 illustrating the size dash numbers arranged in two columns on the side of the inner prism as well as appearing through two windows on the outer prism.

Adjacent to each window is a corresponding projection symbol resembling either two adjacent semicircles 83 or a semicircle adjacent to a circle 84. These symbols relate each window to the particular combination of projections on each face of the device 10 upon which the O-ring to be measured is mounted. The inner prism 11 is provided with a series of dash numbers 85 arranged in columns (See FIG. 8) with each column positioned so that the numbers therein are viewable sequentially through the corresponding window. Thus, in FIG. 8 a left column of numbers 85 may be viewed through the window 75. A projection symbol 83 adjacent to the window 75 indicates that a dash number appearing therein corresponds to an O-ring mounted tautly between the semicylindrical projection 45 on the inner prism 11 and the semicylindrical projection 55 on the outer prism 12. Similarly, a right column of numbers 85 may be viewed through the window 79. A projection symbol 84 adjacent to the window 79 indicates that a dash number appearing therein corresponds to an O-ring mounted tautly between the semicylindrical projection 45 on the inner prism 11 and the cylindrical projection 65 on the outer prism 12. Some numbers 85 may be repeated within the columns on prism 11 to accommodate permissible tolerances within an individual O-ring size.

There are still, however, a few sizes which are too small to be measured by using the pulley-like projections. There are about 30 such dash-number sizes. These are accommodated as shown in FIGS. 1, 2, 3, and 7 in the invention by a series of silhouettes 80, on three faces 17, 18, and 19 of the outer prism 12, each silhouette 80 having an adjacent dash number 81. Small O-rings are simply placed over the silhouettes 80 which are made exactly to size, and the O-rings are matched with the proper silhouette 80. Then the size 81 is immediately below, within, or near that silhouette 80. The other some 320 numbers are obtained by using the sliding prisms 11 and 12 in the manner already described. Since the largest thickness category does not have any O-rings so small as would require silhouettes, the fourth side 20 can be used to print the complete directions for use and explanation of the code, so that the user always has with him the precise directions as to how to use the device.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A device for determining the size dash number of standard O-rings, including in combination:

a pair of telescoping elongated prisms, comprising an outer prism and an inner prism mated to each other and slidable relative to each other, said outer prism including a first end and a second end, said inner prism at all times projecting from said first end of said outer prism and having an end wall, one of said prism having means for determining the thickness category of each standard O-ring, each face of said inner prism having at least one projection having a flat surface parallel to and facing away from said end wall, all said flat surfaces of all said projections lying in a common plane and providing stop means, said outer prism having on each face thereof at said first end at least one projection for matching each projection of said inner prism and forming a mating stop means limiting inward telescopic movement of said inner prism, the matching pairs of projections providing means for supporting O-rings and being keyed to said means for determining the thickness category, said outer prism also having on at least some faces adjacent said second end thereof, an additional O-ring supporting projection, said outer prism having near each said projection an aligning means for each projection, each said aligning means lying on the same face as its corresponding projection and keyed thereto, said inner prism having thereon identifying dash numbers in columns, each column being aligned with a said aligning means and each number being so aligned as to appear in a readable portion aligned with said aligning means when an O-ring is supported by both a projection of said inner prism and a projection of said outer prism, and when said inner prism is extended to a position where said O-ring is taut but not stretched, and printed silhouettes in shapes of standard O-rings too small to enable installation on said projections, said silhouettes being desplayed on faces of said outer prism between the said projections of each respective face along with their dash numbers and along the longitudinal axis of said face which extends in the direction of the extension of said inner prism so that such small-diameter O-rings can be matched by silhouette to give the proper dash number.

2. The device of claim 1 wherein said prisms are rectangular

3. The device of claim 1 having means for locking said prisms.

4. The device of claim 1 wherein said means for determining the thickness category comprises a series of measuring grooves, each said groove having a constant width and having a different width from every other groove, and having a corresponding size category number adjacent thereto, there being a sufficient number of said grooves to provide all the standard O-ring thicknesses, whereby the thickness of any standard O-ring can be determined by matching it with a said groove.

5. The device of claim 4 wherein the projections on said inner prism are each generally semicylindrical having an arcuate portion facing said end of said inner prism and a flat diametral surface parallel to and facing away from said end and the projections on said outer prism are also semicylindrical for matching each semicylindrical projection of said inner prism and forming a mating stop means limiting inward telescopic movement of said inner prism, the matching pairs of semicylindrical projections forming respective cylinders, each projection being grooved to provide, when said projections lie against each other, an annular groove with an inner surface that is semicircular in cross section.

6. The device of claim 5 wherein said additional projections are cylindrical and are the same diameter as a semicylindrical projection on the same face thereof and having an annular groove of the same configuration.

7. The device of claim 6 wherein each said aligning means is a window through said outer prism.

* * * * *